United States Patent [19]

Waters et al.

[11] Patent Number: 5,841,980
[45] Date of Patent: Nov. 24, 1998

[54] DISTRIBUTED SYSTEM FOR COMMUNICATION NETWORKS IN MULTI-USER APPLICATIONS

[75] Inventors: Rolland M. Waters, Seattle; John Allred, Renton, both of Wash.

[73] Assignee: RTime, Inc., Seattle, Wash.

[21] Appl. No.: 648,839

[22] Filed: May 15, 1996

[51] Int. Cl.⁶ ............................. G06F 13/38; G06F 15/17
[52] U.S. Cl. ............................ 395/200.34; 395/200.35; 345/330; 707/201; 463/42
[58] Field of Search ................... 395/200.34, 200.35, 395/200.31, 200.33, 200.38, 200.47, 200.48, 200.57, 200.66, 182.02; 370/328, 432, 312; 455/435, 449; 465/42; 345/330, 331; 707/201; 463/42

[56] References Cited

U.S. PATENT DOCUMENTS

| | | | |
|---|---|---|---|
| 5,247,615 | 9/1993 | Mori et al. | 395/200.34 |
| 5,313,631 | 5/1994 | Kao . | |
| 5,317,568 | 5/1994 | Bixby et al. . | |
| 5,442,771 | 8/1995 | Filepp et al. . | |
| 5,517,494 | 5/1996 | Green | 370/60 |
| 5,519,706 | 5/1996 | Bantz et al. | 370/85.3 |
| 5,577,208 | 11/1996 | Courturier | 395/200.34 |
| 5,583,993 | 12/1996 | Foster et al. | 395/200.34 |
| 5,586,257 | 12/1996 | Perlman | 465/42 |
| 5,600,644 | 2/1997 | Chang et al. | 370/404 |
| 5,608,725 | 3/1997 | Virgile | 370/60 |
| 5,617,539 | 4/1997 | Ludwig et al. | 395/200.34 |
| 5,633,872 | 5/1997 | Dinkins . | |
| 5,644,571 | 7/1997 | Seaman | 370/401 |
| 5,659,691 | 8/1997 | Durward et al. | 395/329 |
| 5,674,127 | 10/1997 | Horstmann et al. | 395/200.34 |

*Primary Examiner*—Mark H. Rinehart
*Attorney, Agent, or Firm*—Christensen O'Connor Johnson & Kindness PLLC

[57] ABSTRACT

The present invention is directed to overcoming bandwidth limitations of network backbones to allow for true national participation in multi-user applications across a large-scale network. Three techniques are used to minimize the amount of backbone loading: (1) A fully distributed system architecture is described that retains national participation in each application environment by allocating resources among responsible servers at remote locations; (2) Multiple zones of interest are defined within an application environment so that only relevant data applicable to each participant within a given application environment is transmitted across the network backbone; and (3) Seamless multi-server management is described that provides interaction across application environment regional boundaries without sacrificing continuity among participants or increasing the number of postcards transmitted. The present invention therefore provides a distributed system that offers multi-user applications nationwide interaction among participants within the present bandwidth limitations of existing network backbones.

54 Claims, 11 Drawing Sheets

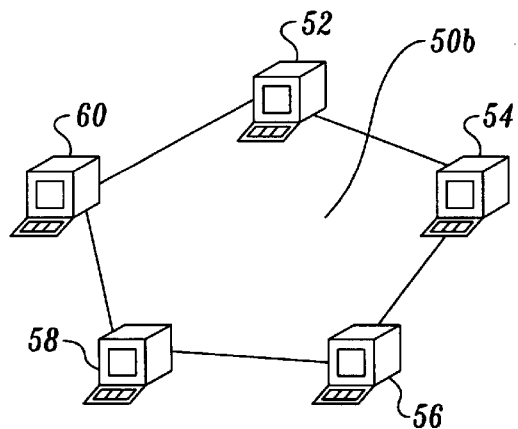
Fig. 7A
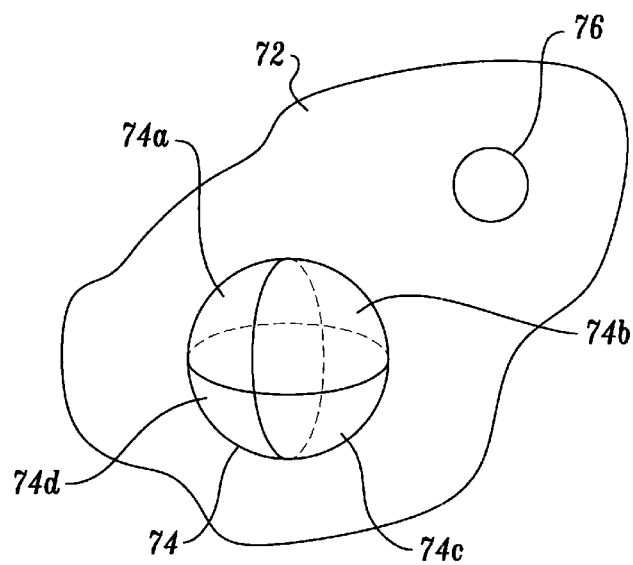
Fig. 7B
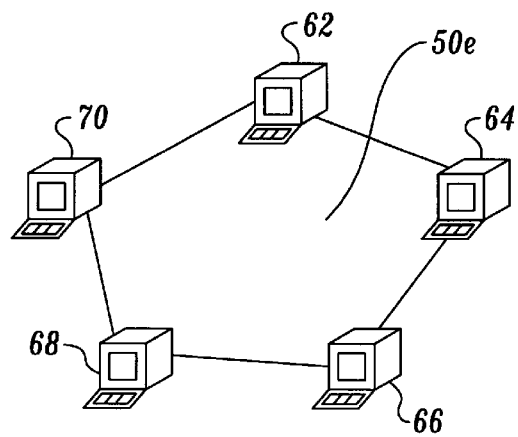
Fig. 7C
| REGION | ASSIGNED SERVERS |
|---|---|
| 74a | 52, 62 |
| 74b | 54, 64 |
| 74c | 56, 66 |
| 74d | 58, 68 |
| 76 | 60, 70 |
Fig. 7D

| REGION | ASSIGNED SERVERS |
|--------|------------------|
| A | 130, 162 |
| B | 132, 164 |
| C | 134, 166 |
| D | 136, 168 |
| E | 138, 170 |
| F | 140, 172 |
| G | 142, 174 |
| H | 144, 176 |
| I | 146, 178 |
| J | 148, 180 |
| K | 150, 182 |
| L | 152, 184 |
| M | 154, 186 |
| N | 156, 188 |
| O | 158, 190 |
| P | 160, 192 |

DISTRIBUTED SYSTEM FOR COMMUNICATION NETWORKS IN MULTI-USER APPLICATIONS

FIELD OF THE INVENTION

This invention generally relates to multi-user applications operating across communication networks, and particularly relates to a distributed system for optimizing interaction among multi-users within an application across a large-scale network.

BACKGROUND OF THE INVENTION

Communication networks are well known in the computer communications field. By definition, a network is a group of computers and associated devices that are connected by communications facilities or links. Network connections can be of a permanent nature, such as via cables, or can be of a temporary nature, such as connections made through telephone or other communication links. Networks vary in size, from a local area network (LAN) consisting of a few computers and related devices, to a wide area network (WAN) which interconnects computers and LANS that are geographically dispersed. An internetwork, in turn, is the joining of multiple computer networks, both similar and dissimilar, by means of gateways or routers that facilitate data transfer and conversion from various networks. A well known abbreviation for internetwork is internet. As currently understood, the capitalized term Internet refers to the collection of networks and gateways that uses a Transmission Control Protocol/Internet Protocol (TCP/IP). The Internet has recently seen explosive growth by virtue of its ability to link computers located throughout the world.

As previously discussed, both networks and internets are connected by means of communications links. Communication links within small networks may be cables, while such links in larger networks and internets may include ethernet connections, analog telephone lines, and digital T-1 lines. The structure of such links among computers and networks has often been referred to as the infrastructure of the particular network or internet. Each network or internet, in turn, has one or more principal links that connects primary nodes of the particular network by means of network "backbones." Often analogized to the interstate highway infrastructure, network backbones are designed to carry a high volume of traffic between primary network nodes. Backbones are often defined in relation to the type of communications link used to transmit data along the backbone between nodes. Popular national network backbone link types include newer multicast protocols such as the Asynchronous Transfer Mode (ATM) and more conventional point-to-point links. The type of protocol or link used helps define the manner in which data is transmitted along the particular backbone. When data transmission occurs along a network backbone using a multicast protocol, information is sent directly after a brief setup time between sender and receiver. The data is therefore transferred along the most expeditious route across the network infrastructure to its destination. Data transmission occurring along a network backbone using a conventional point-to-point link, in contrast, requires routing over multiple point-to-point links between source and destination.

The volume of data transmitted across a network backbone is dependent on the bandwidth of the particular backbone. In computer networks, greater bandwidth indicates faster data transfer capability. Multiple data transmissions are sent along a network backbone using multiplexing techniques, whereby the volume of data transmission along the backbone is determined by the bandwidth of the particular link. Although a factor in all network communications, bandwidth limitations create particular problems in transmissions across national network backbones, regardless of the protocol or link used.

A simple example is illustrative of data transfer delay due to limited backbone bandwidth: FIG. 1 shows a simple graphical depiction of the boundaries of a particular geographical territory, in this case the United States. Within the boundaries are five discrete areas labeled A through E representing computer networks local to each specific area. Each of the five area networks is connected via a series of communication links by a national network backbone 10.

The bandwidth of network backbone 10 allows for a certain volume of data traffic. For purposes of the example, the backbone bandwidth will be assumed to be limited to the simultaneous transfer of 1,000 individual, equal-sized packets of data (hereinafter referred to as "postcards"). While either the number of postcards being sent along the backbone is very small, or the urgency of each postcard is not very great (i.e., the delivery of the postcard can be delayed), the bandwidth of the network backbone 10 can accommodate a great deal of transmission traffic. As can be anticipated, however, increasing the number of postcards sent from each area along the network backbone reduces the number of postcards from other areas that can be transmitted at the same time. If, for example, Area A sends 1,000 postcards to Area C at the same time Area B sends 1,000 postcards to Area C, due to bandwidth limitations on the network backbone, all 2,000 postcards will not arrive simultaneously at Area C. Tradeoffs will take place depending on the timing of each postcard sent, which in turn will prioritize the postcards and delay certain data in reaching Area C.

Because of the relative speed with which data is transmitted over a network backbones and the relatively small amount of data transmitted in each postcard, the delay in postcard delivery, or postcard latency, caused by network bandwidth limitations has not traditionally been a significant drawback in network operations. Recent development of multi-user interactive applications, however, has made this a pressing issue.

A multi-user application is a computer program run on a computer system that allows multiple participants that are geographically dispersed to interact with the computer program and other users in an application environment, typically via communication links. For example, a multi-user application may be an aircraft combat simulation that allows participants to pilot an aircraft within an airspace and to engage in combat with other participants in the same airspace. The frequency and extent to which users in a multi-user application interact with the computer program and other users is dependent on a variety of considerations. The considerations include the data transmission capacity of the relevant communication links between each user and the computer system, the nature of the application (whether it implicates data-intensive operations involving graphics or multimedia), and, to a lesser extent, the geographical proximity of each user to the computer system. If real-time interaction is required among users within the application environment, implicating data-intensive operations, the data transmission capacity of the communication links becomes especially critical.

Each application environment defines specific boundaries in which one or more participants may operate. In the above aircraft combat simulation example, the airspace in which the aircraft is piloted may be analogized to the application environment. Heretofore, to facilitate true interaction among participants within an application environment, complete information on every participant within a given environment needed to be transmitted to every other participant in that environment. When such complete information or data was sent via postcards over the network backbone, the bandwidth limitations discussed above either limited the number of participants or prohibited complex applications requiring real-time interaction among participants. The more complex the application, the greater the need for complete information about each participant. More information, in turn, resulted in larger postcards which increased the burden on the network backbone. For these reasons, existing multi-user applications have been unable to achieve national interactivity among participants. An example referencing FIG. 2 is illustrative.

FIG. 2 is a simple graphical depiction of the United States showing a hypothetical multi-user application system 15. Five discrete areas labeled A through E, representing distinct computer networks, are connected by network backbone 10. Assume that Area B contains 100 participants (illustrated as blocks off Area B) in the multi-user application 15 that are managed by a centralized computer workstation or server 12 in Area C. Server 12 has the responsibility of informing each of the 100 participants in Area B about each of the other 99 participants in that area. At preselected time intervals, each of the 100 participants in Area B sends a single postcard to server 12 in Area C describing the participant's current situation. The net result is that at any give time, 100 postcards are transmitted along the network backbone 10 from Area B to server 12 in Area C. Assuming the bandwidth limitation described above and depending on network backbone traffic, the 100 postcards sent to Area C, by themselves, likely have little impact on the 1,000 postcard limit of the network backbone.

The bandwidth limitation of the network backbone becomes a critical factor in network operation, however, at server 12 in Area C. Server 12 receives the 100 postcards and copies each postcard one hundred times to provide one postcard describing each participant to each of the other 99 participants, plus a confirmation postcard to each originating participant. Server 12 then transmits 100 copied postcards back along the network backbone 10 to each participant in Area B. In other words, in order to ensure full interaction among all participants, server 12 is required to transmit 100 postcards to each of the 100 participants in Area B, or 10,000 total postcards along the network backbone 10. Because of the bandwidth limitations of network backbone 10 the postcards can only be transmitted 1,000 at a time. While each of the 100 participants in Area B will ultimately receive their 100 postcards, they will receive them subject to a delay caused by server 12 having to perform multiple transmissions. The delay guarantees that all postcards will not be received simultaneously by each of the other participants, and thus precludes real-time operation.

The backbone loading problem illustrated in FIG. 2 demonstrates a send/receive imbalance present in any type of centrally administered multi-user application. In order for remote participants to remain aware of other participants, a central server will always be sending out a greater number of postcards than it receives. While the send/receive imbalance has existed since networks and internets were created with bandwidth-limited backbones, the bandwidth limitations have not been properly resolved in large-scale network multi-user applications for three reasons.

First, server limitations in centrally operated multi-user applications have kept the network backbone loading problem from becoming acute. Existing centrally located servers used to administer multi-user applications and provide application information to remote participants have been limited in their ability to generate sufficient return postcards to overload the network backbone. In other words, with reference to the hypothetical system in FIG. 2, server 12 has traditionally been unable to make and transmit 10,000 postcard copies at the same time. As a result, server 12 has been forced to copy a portion of the 10,000 postcards, transmit them to Area B, copy another portion of postcards, transmit them to Area B, and so on. Because server 12 lacks the technological ability to copy and transmit all 10,000 postcards at the same time, it is unable to overload the network backbone.

Second, existing multi-user applications generally require that only small amounts of data be carried in each postcard. As will be appreciated, a small amount of data in each postcard translates to a larger volume of postcards capable of being transmitted across the network backbone. In the example discussed above, the network backbone could handle 1,000 postcards of a certain size. If a much smaller amount of data is needed to be transmitted in each postcard, the backbone could handle a greater number of postcards. In other words, the number of postcards capable of transmission across the network backbone is inversely related to the amount of data in each postcard.

Third, existing multi-user applications involve only a small number of participants which, in turn, typically require only a small number of postcards. Often, the small number of participants are connected within a limited geographical area by a dedicated server. Each local server is therefore able to manage the smaller number of postcards required without utilizing the national network backbone. Maintaining a small number of participants per multi-user application has to date been the primary solution for postcard latency problems. However, such multi-player applications only simulate national interactive participation. Without addressing or overcoming the limitations associated with national network backbone burdening, existing multi-user applications are only able to achieve area or subarea, as opposed to national, participation in any given multi-user environment.

Existing multi-user applications have been extremely limited in their ability to overcome bandwidth limitations throughout the network to provide for real-time, data intensive, interactive participation. The tradeoffs between the amount of data needed in each postcard and the number of participants across a particular network backbone have limited the ability of multi-user applications to achieve national participation where all participants are aware of all other relevant participants within their particular application environment. The greater the amount of data transmitted about each participant in a particular application environment, the fewer the number of participants able to participate. While sacrificing data to enable a greater number of participants has been used in existing systems, such solution is unworkable when seeking real-time interaction because limiting data either restricts participation to limited areas or prevents seamless participation within a given application environment. If inadequate or insufficient data is communicated to relevant participants in a multi-user application, participants will be unable to satisfactorily participate. The tradeoffs in data transfer and number of participants have limited the development of truly national multi-user applications.

Accordingly, it is evident that there is a need for a system for optimizing interaction among multi-users across a communication network. Such a system should be able to reduce backbone loading by optimizing utilization of bandwidth resources. The present invention is directed to fulfilling this need.

SUMMARY OF THE INVENTION

In accordance with the present invention, a distributed system is provided for reducing the bandwidth loading of a multi-user application operating over a communication network. Bandwidth usage along primary network backbones is effectively minimized in multi-user applications by decentralizing application administration to shift the focus of the send/receive imbalance inherent in such systems closer to the individual participants. A fully distributed server system architecture is defined that retains national participation in each application environment by allocating resources among responsible servers at remote locations while retaining postcard distribution at a reduced volume to all relevant participants along the primary network backbone.

The present invention further optimizes bandwidth and reduces network backbone loading by transmitting only the most pertinent data to each participant. Multiple zones of interest are defined relative to an application environment and participants in the application environment based on object type, position relative to the participant or a predetermined location in the environment, and priority. By defining the multiple zones of interest within the application environment, only relevant data applicable to each participant within the given application environment is transmitted along the network backbone. The overall number of postcards is therefore reduced in proportion to the number of participants operating in each application environment.

The present invention further provides for seamless multi-server management of the application environment. The application environment of a multi-user application is divided into regions. Multiple local servers are assigned to administer the multi-user application, one or more servers dedicated to managing participants within a particular region of the application environment. By use of multiple zones of interest around each server to indicate when data should be transmitted between neighboring servers managing neighboring regions, interaction across regional boundaries is provided without sacrificing continuity among participants or significantly increasing the number of postcards transmitted.

The present invention therefore provides a distributed system that offers multi-user applications nationwide interaction among participants within the present bandwidth limitations of existing network backbones.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7A is a graphical depiction of one of the plurality of discrete local area computer networks of FIG. 6 having five servers;

FIG. 7B is a graphical depiction of another one of the plurality of discrete local area computer networks of FIG. 6 having five servers;

FIG. 7C is a graphical depiction of an application environment in a multi-user application that is divided into regions, each region being managed by a server as described in the present invention;

FIG. 7D is a table showing a correspondence between the servers set forth in FIGS. 7A and 7B and management of the specific application environment regions defined in FIG. 7C;

DETAILED DESCRIPTION OF THE PREFERRED EMBODIMENT

The present invention is directed to overcoming bandwidth limitations of network backbones to allow for true national participation in multi-user applications across a large-scale network. Three techniques are used to minimize the amount of backbone loading: (1) A fully distributed system architecture is described that retains national participation in each application environment by allocating resources among responsible servers at remote locations; (2) Multiple zones of interest are defined within an application environment so that only relevant data applicable to each participant within a given application environment is transmitted across the network backbone; and (3) Seamless multi-server management is described that provides interaction across application environment regional boundaries without sacrificing continuity among participants or increasing the number of postcards transmitted. Each of these aspects of the present invention will be discussed in turn below.

Distributed System for Multi-User Application

Figure 3:
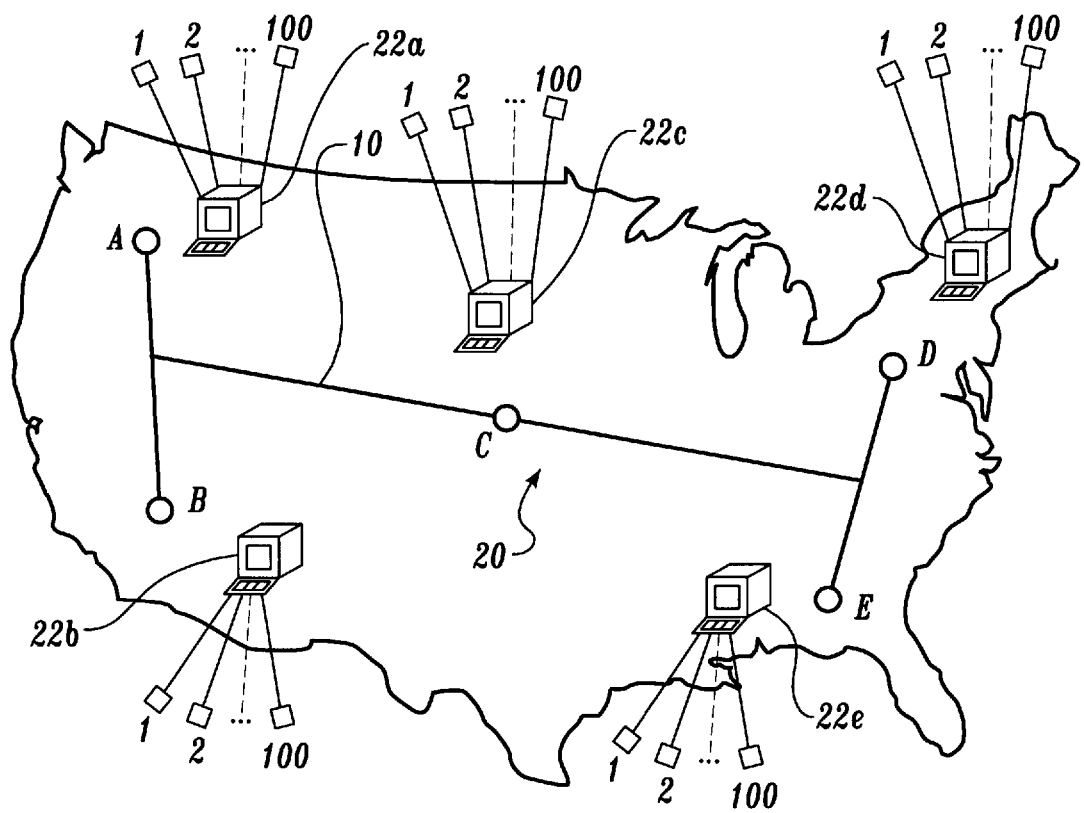
FIG. 3 is a graphical depiction showing a distributed system formed in accordance with the present invention for managing a multi-user application over a national network backbone connecting a plurality of discrete local areas representing distinct computer networks.

A distributed system 20 in accordance with the present invention is depicted in FIG. 3 as falling within the boundary of a particular geographical territory, in this case the United States. Five discrete areas labeled A through E are defined in the system. Each area A through E represents a single server 22a through 22e, respectively, that are connected to each other by a national network backbone 10. For purposes of illustrating the distributed system of the present invention, each server 22 serves an equal number of participants in each region, for example, 100 participants, illustrated as blocks off each server. It will be appreciated, however, that the servers can vary in size and type, as can the number of participants that they serve.

Rather than having a single server run a multi-user application, a common multi-user application is configured to operate on all servers in the distributed system 20. The multi-user application creates a single application environment in which all users operate. Instead of having a single server monitor and manage participant activity within the application environment, participation in the application environment is administered by each of the servers within the distributed system 20. Effectively, the application environment is "mirrored" on each area server.

As shown in FIG. 3, each area server 22 manages for its 100 specific participants the environment for the multi-user application in progress across all servers. Each server 22 forwards information about its own 100 participants to the server in the other regions, and receives postcards describing the 100 participants in each of the other four regions. Each server 22 is therefore able to manage the participation of not only its 100 direct participants, but also all other participants throughout the national multi-user application without proportionately increasing the burden on the network backbone 10. In other words, unlike prior art centralized server applications that avoided bandwidth limitations along the network backbone by providing primarily area and subarea participation for all participants in a limited geographical area, the distributed system of the present invention allows participation in a single national multi-user application environment regardless of the geographical location of the participant.

Figure 4A:
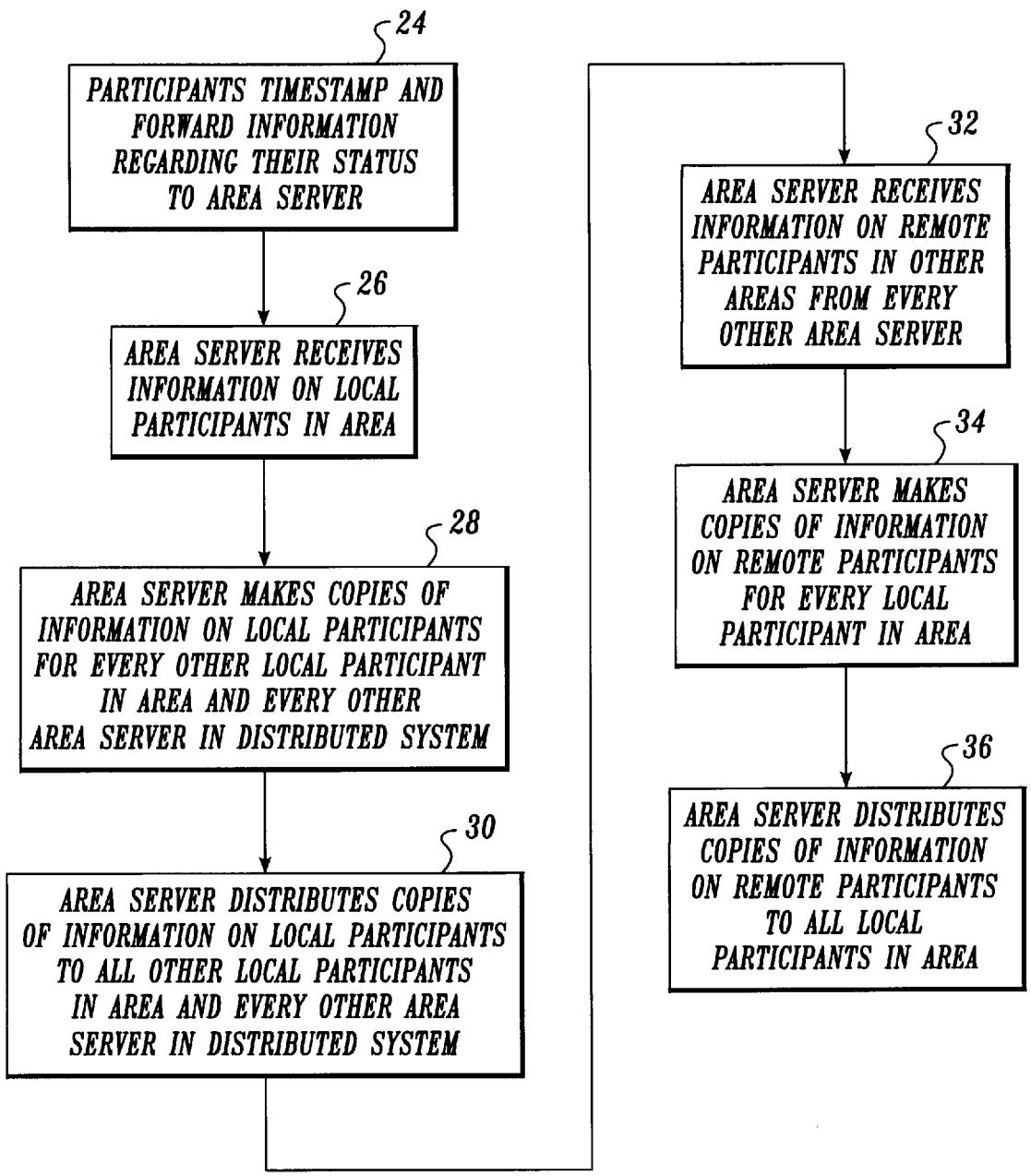
FIG. 4A is a flowchart of the operational logic of the distributed system formed in accordance with the present invention.

FIG. 4A constitutes a flowchart of the operational logic of distributed system 20 formed in accordance with the present invention. At a block 24, participants in the multi-user application timestamp information regarding their present status and forward the information to area server 22. Such information could include participant location as well as outbound communications to other participants. Depending upon the multi-user application requirements, the information received from each participant could be forwarded to the area server at preselected time intervals during the course of application operation, or upon a change to the status of the participant. As discussed in greater detail below, the timestamp on each participant's information is used in the multi-user application to extrapolate current participant status to other participants throughout the application environment.

At a block 26, the area server 22 receives postcards containing the information on local participants in the area it manages. At a block 28, the area server 22 makes copies of the information received from each local participant for distribution to all other local participants and every other area server in distributed system 20. The number of distribution copies needed is therefore dependent on the number of local participants and on the number of other area servers involved in administering the multi-user application. At a block 30, area server 22 distributes copies of the information on each local participant to all other local participants as well as to every other area server in the distributed system. The blocks of information or postcards are transmitted over the area network to local participants and over national network backbones to the other area servers.

At a block 32, area server 22 receives postcards containing information on participants in other area of distributed system 20 from every other area server. The timing of the receipt of these postcards is dependent not only on the type of network backbone protocol or link, but also on the amount of data in each postcard and the relative traffic on the network backbone. At a block 34, area server 22 makes a copy of the information received on remote participants for every local participant it manages in its area. At a block 36, area server 22 distributes copies of information on remote participants to all local participants in its area across the area network.

The timestamp associated with information from each participant is used continuously throughout the multi-user application by both participants and servers to update individual participant status based on an extrapolation of the information received. The timestamp contains time and date information associated with the objects relevant to each participant. Use of the timestamp throughout the multi-user application facilitates maintenance of a timebase constant throughout the application environment. A timebase constant is particularly important in highly interactive multi-user applications where participation occurs in real-time.

A numerical example illustrates the advantages of using distributed system 20 in a single environment, multi-user application. At preselected time intervals, each of the 100 participants in each area sends a single postcard to the server in their area. Assuming network backbone 10 is based on an multicast protocol, each area server copies each postcard 101 times, 100 times to send a copy to each of its 100 participants, and one time to route a copy to the other area servers. Each server 22 would therefore send out 100 postcards along the national network backbone 10 to the four other servers involved in administering the single environment of the multi-user application. Multicast addressing allows a single postcard to be delivered to each of the other four servers. Assuming network backbone 10 is based on a conventional point-to-point link, each area server copies each postcard 104 times, 100 times to send a copy to each of its 100 participants, and one time to send a copy to each of the other area servers. Each server 22 would therefore send out 400 postcards along the national network backbone 10, 100 to each of the four other servers involved in administering the single environment of the multi-user application.

A reduction in the use of backbone bandwidth is achieved regardless of whether the backbone operates with a multicast protocol or conventional point-to-point link. With a backbone using a multicast protocol, the mathematical representation for the total number of postcards on the national network backbone 10, assuming exclusive usage of the backbone for the multi-user application, would be expressed as:

$$5\text{(total servers)} \times 100\text{(number of postcards per server)} = 500 \quad (1)$$

Figure 1:
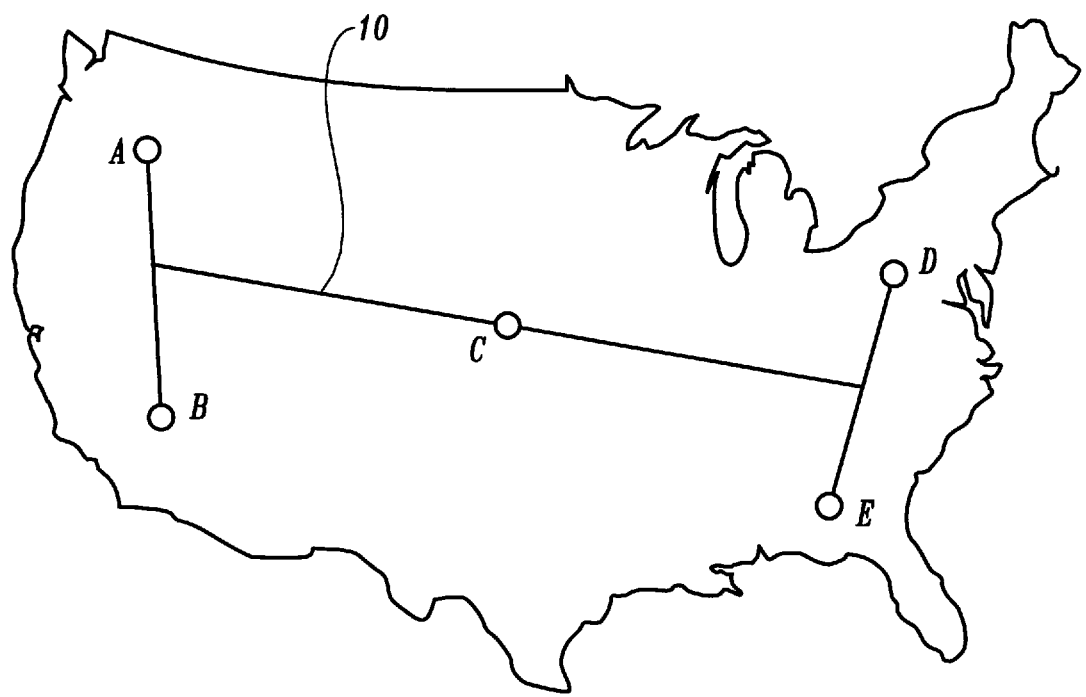
FIG. 1 is a graphical depiction of the boundaries of the United States illustrating a prior art national communications link connecting five discrete local area computer networks.
Figure 2:
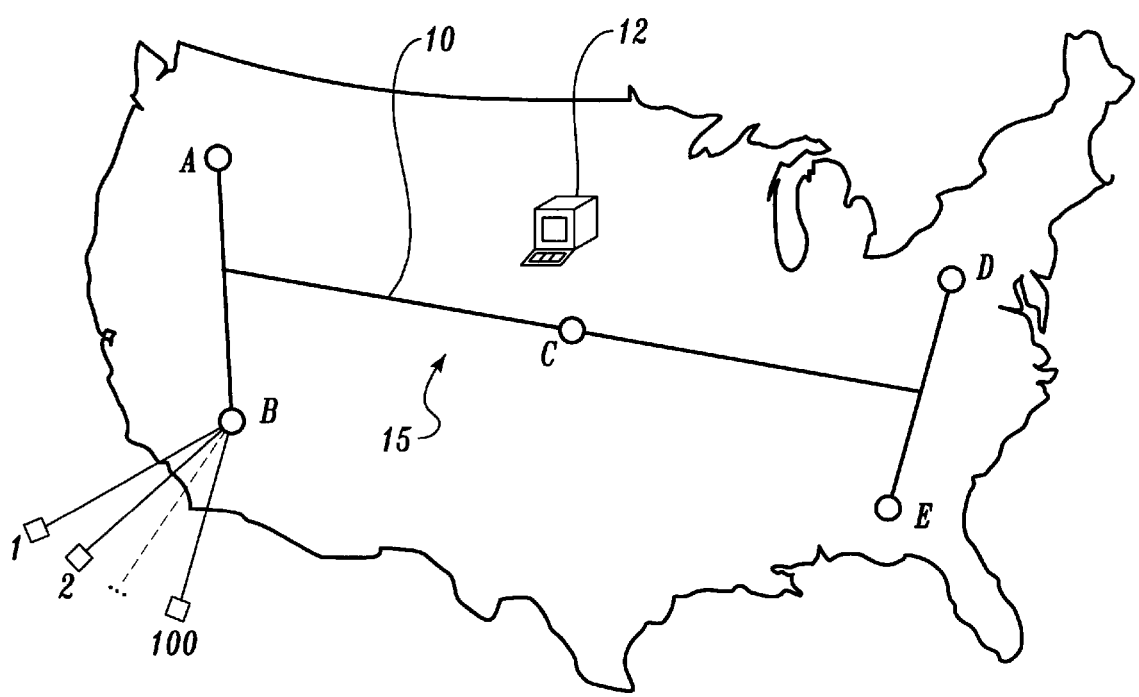
FIG. 2 is a graphical depiction of a prior art centralized system for managing a multi-user application over a national network backbone.

Contrast distributed system 20 with the centralized server 12 system shown in FIG. 2. Assuming a backbone using a multicast protocol and the same number of participants at each area server, the mathematical expression for the total number of postcards sent by centralized server 12 would be expressed as follows:

$$5\text{(total servers)} \times 100\text{(participants)} \times 100\text{(postcards per area)} = 50{,}000 \quad (2)$$

With a backbone using a conventional point-to-point link, each area server 22 would be required to send a separate copy of 100 postcards representing its respective 100 participants to each of the other area servers. The mathematical representation for the total number of postcards on the national network backbone 10 in the distributed system 20 would be expressed as follows:

$$5\text{(total servers)} \times 100\text{(postcards)} \times 4\text{(other servers)} = 2{,}000 \quad (3)$$

In contrast, centralized server 12 connected to a backbone using a conventional point-to-point link and having the same number of participants at each regional server would be required to transmit the following number of postcards:

$$5\text{(total servers)} \times 100\text{(participants)} \times 4\text{(other severs)} \times 100\text{(postcards)} = 200{,}000 \quad (4)$$

Depending on the type of communication protocol or link used and the relevant bandwidth of the network backbone 10, the distributed system of the present invention dramatically decreases the amount of bandwidth used on the backbone. The distributed system therefore increases the number of participants in a true national multi-user application. Assuming a bandwidth allowing 1,000 postcards at any given moment, the distributed system of the present invention in conjunction with a backbone using a multicast protocol would allow 1,000 participants in a national multi-user application. In contrast, a centralized server on a backbone using a multicast protocol would be limited to approximately 70 participants at any given time. On a backbone using a conventional point-to-point link, 250 participants would be allowed in the disclosed distributed system 20, compared with approximately 35 participants on a centralized server.

Filtration Using Zones of Interest

The distributed system 20 of the present invention also minimizes the effect of bandwidth limitations found along network backbones by defining the environment of a given multi-user application so that only the most pertinent data about a given participant in the environment is transmitted to other relevant participants. Whereas existing multi-user applications sacrifice data to enable a greater number of participants in a given environment, thereby precluding true real-time interactive participation in a data intensive application, the distributed system of the present invention provides a method of focusing the data based on its relevance to each participant in the application environment. Data transfer is reduced by defining multiple zones of interest related to application environments or participants in an application environment based on a set of predetermined characteristics designed to facilitate transmission of only the most pertinent data to relevant co-participants.

The zones of interest are defined according to the needs of the multi-user application and the relevant application environment. Zones of interest are dynamic in nature, highly dependent on the object type attributed to the participant as well as the relative location of the participant within the application environment proximate to both environment boundaries and other participants. The relative priority of each zone of interest is proportionally related to the amount of data necessary to communicate information to interested participants. Multiple zones of interest may be defined relative to anything in the application environment, including relative to a fixed location in the application environment, an application object, a local participant, or with respect to another participant.

Preferably, the zone of interest is defined based on an object type, the position of the zone boundaries relative to the object, and the priority of the zone of interest based on its proximity to and relationship with a participant. An object type is generally characterized as either real, data, text, or event, but may include user definable subtypes. A real object is a participant or a thing in the application environment updated in real-time by the application. Attributes of a real object include such things as object orientation, location, appearance, and object type. A data object carries a participant's identity, status, or other generic information pertaining to that participant and transmitted to other participants. A text object provides for text-based materials necessary to support interactive participant communication and other ASCII applications. The present invention also provides for spawning of object "children" of object type real, data, or text that are directly linked to the parent real object. An event object is used to implement interaction among participants and has such attributes as the type of event, location of the event and event duration. Event objects may have attributes defined as directed or undirected events, or both. A directed event is an action delivered to one or more real objects, while an undirected event may be based on geographic area and delivered to multiple real objects within an application environment.

In order to optimally utilize bandwidth along network backbones and communication links, the distributed system of the present invention focuses participant data by filtering out the least pertinent information for communication across the network to relevant participants in the multi-user application. This is accomplished by providing a universal interface with multi-user applications whereby each application is able to efficiently associate application data with the generic zones of interest defined above relative to participants in an application environment. Specifically, through definition of dynamic zones of interest in an application environment based on object characteristics independent of specific multi-user participant attributes, the distributed system of the present invention provides for high level application interface into a multi-user application.

The proper interface requires associating application data with generic zones of interest in a way to optimize object handling within the application environment. This interface provides for the creation and handling of real objects as well as the creation and maintenance of data, text, and event objects. This is accomplished by associating with the generic zone of interest by linking or funneling data relative to characteristics of the objects described above to the distributed system. The filtering aspect of the distributed system then updates and maintains the zone of interest and filters relevant data related to each participant to optimally utilize the bandwidth across the communication link or network backbone. The data association and subsequent filtration is done invisibly to the multi-user application, but in such a way that each multi-user application defines the zone of interest dictated by participant needs within the application environment. The filtration aspect of the present invention thus provides for defining zones of interest and filtering data regardless of the multi-user application.

The following Table 1 sets forth the four primary objects discussed above. It should be appreciated that additional objects may be defined having characteristics relevant to various multi-user applications. A voice object, for example, might be contemplated in applications requiring verbal interaction among the participants within an application environment. Such a voice object would, in turn, have attributes relative to vocal characteristics.

TABLE 1

| Object | Description |
| --- | --- |
| Real | Participant or thing in the world updated in real-time by multi-user application. |
| Data | Participant identity, status or other generic data among relevant participants. |
| Text | Interparticipant communication and related ASCII applications. |
| Event | Directed, undirected, or both; used to implement interactions among participants within an application environment. |

Figure 5:
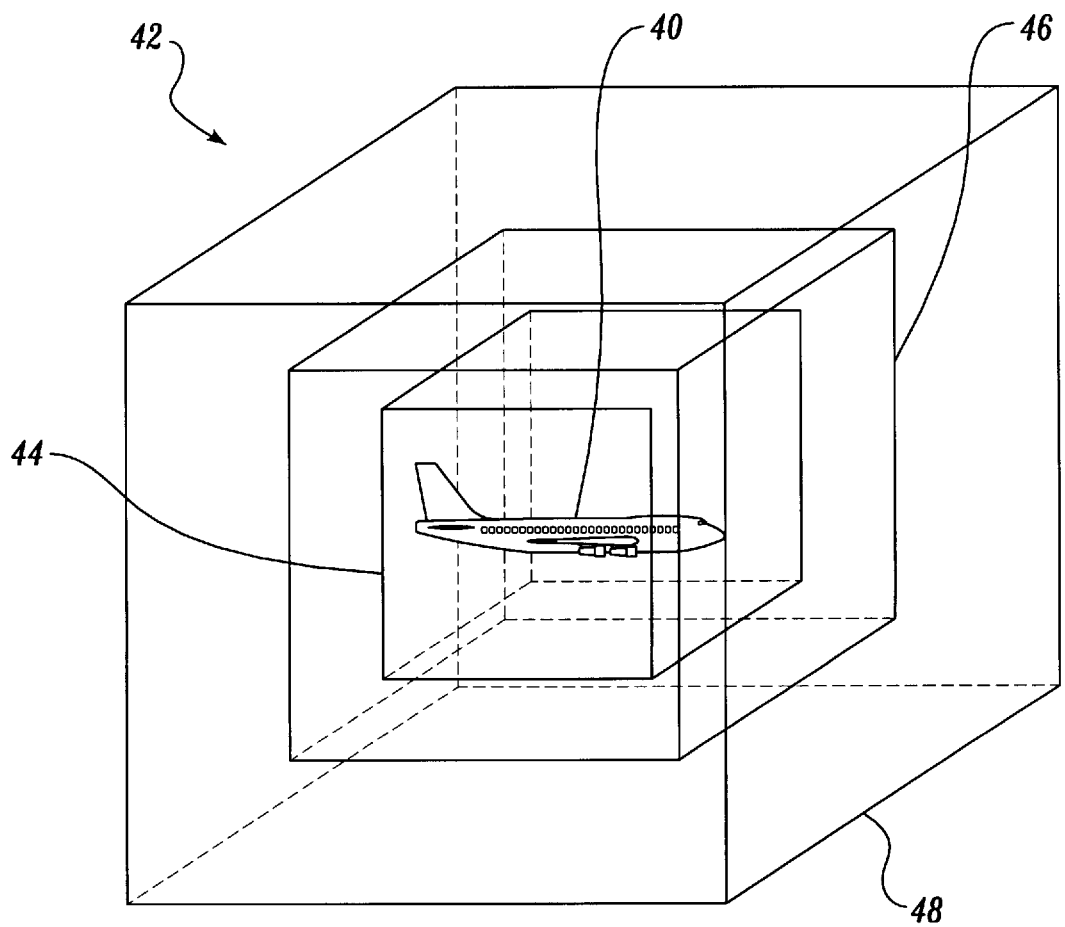
FIG. 5 is a graphical depiction of an application environment that is divided into multiple zones of interest relative to a representative participant in a multi-user application.

A division of an application environment 42 into multiple zones of interest relative to a participant in a multi-user application is depicted in FIG. 5. FIG. 5 shows a representative participant 40 in a multi-user application, for example, a military aircraft in an aircraft combat simulation. A first zone of interest 44 is conveniently thought of as a box or container surrounding the aircraft. It will be appreciated that any number of geometric shapes could define the boundaries of a zone of interest. The zone of interest is associated with the aircraft, maintained relative to the actual position of aircraft 40, and maintained according to specific xyz coordinates.

The participant 40 in this simulation is characterized as a real object of type "airplane." The first zone of interest 44 is the airspace closely proximate to the plane, so defined such that all participants or, rather, competing aircraft engaged in direct combat with the participant 40 would be highly relevant to the participant. The first zone of interest 44 is given a high priority, or, in other words, a fast data rate for transmission of data across the network backbone. Any object implicated within zone of interest 44 is highly relevant to participant 40 and therefore all information or data relating to this zone must be transmitted from all other participants within the first zone of interest in the application environment.

A second zone of interest 46 surrounds both participant 40 and the first zone of interest 44. The second zone of interest is a superset of the first zone of interest 44 and implicates an area within application environment 42 broader than that of first zone of interest. In the aircraft simulation example, some objects within the second zone of interest 46 may be defined as real, and may include data types such as missiles fired in the direction of the aircraft of participant 40. The xyz coordinate position of the second zone of interest 46 with respect to participant 40 remains proximate because all objects within the second zone of interest 46 remain highly relevant to participant 40. The second zone of interest is therefore given a high priority requiring a fast data transmission rate to facilitate real-time interaction with objects implicated in the second zone of interest.

A third zone of interest 48 surrounds participant 40, the first zone of interest 44, and the second zone of interest 46. The third zone of interest may likewise contain real objects of data types, including enemy planes and missiles in our military aircraft example. The position of the third zone of interest with respect to participant 40 extends much more distant than either the second zone of interest or the first zone of interest, and it is a superset of both zones. Because the third zone of interest 48 encompasses a great deal more area within the application environment 42, and because participant 40 is much less interested in the details of objects within the third zone of interest 48, but outside the first and second zones of interest, the third zone of interest is given a lower priority requiring a lower data transmission rate. Conveniently analogized to the detail shown in an aircraft radar system, participant 40 desires only minimal information about objects in the larger third zone of interest. The amount of detail about the objects in the third zone of interest in many cases will only encompass the location of the object with respect to the participant.

It will be appreciated that the above zone of interest definition could likewise be used in a multi-user application to allow participants to selectively send information to relevant participants within the application environment.

Figure 4B:
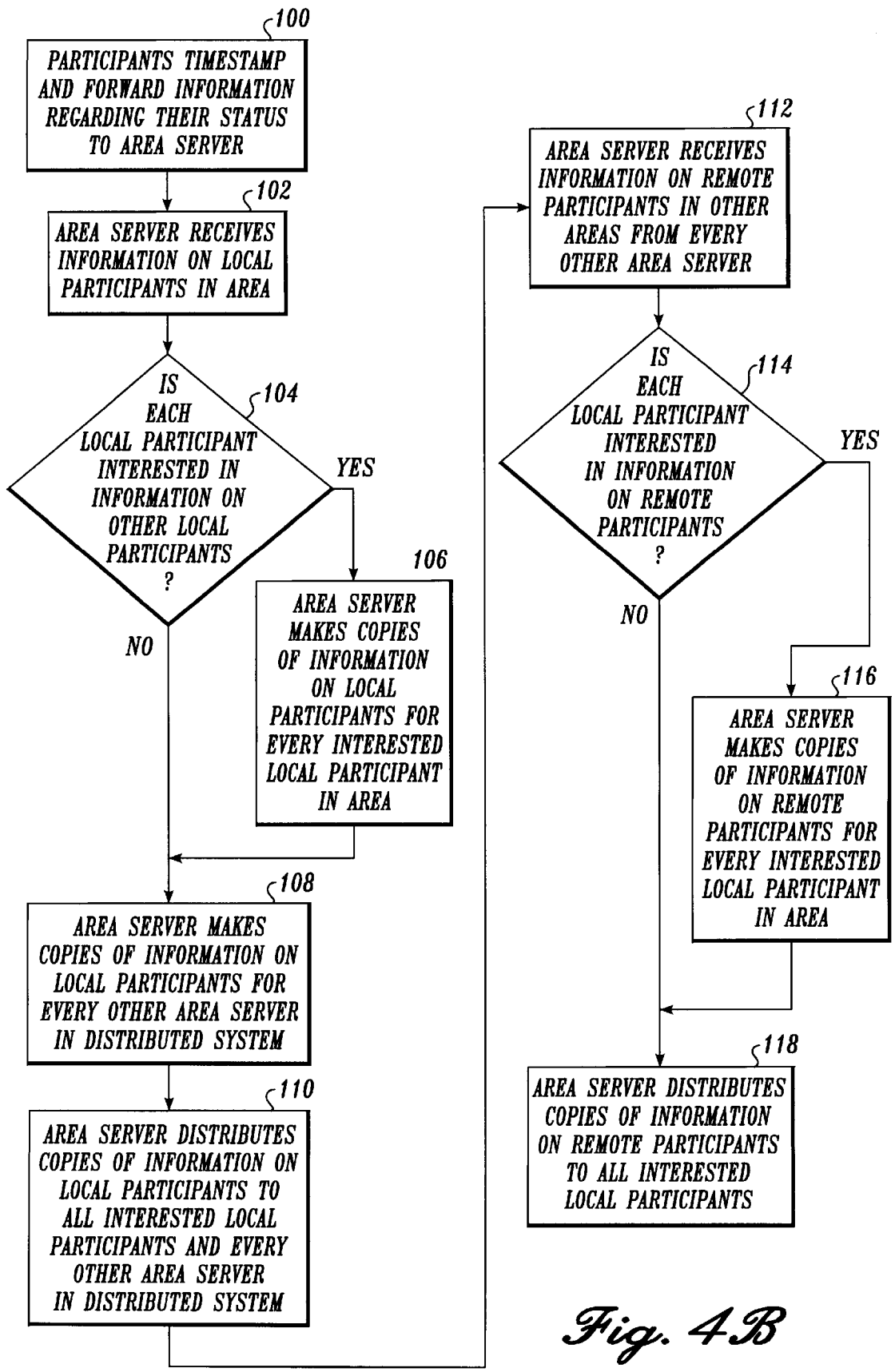
FIG. 4B is a flowchart of the operational logic of the distributed system of FIG. 4A further incorporating the operational logic of the filtration aspect of the present invention.

Filtration using the zones of interest defined according to the present invention can be incorporated into the operational logic of the distributed system 20 discussed above. FIG. 4B constitutes a flowchart of the operational logic of distributed system 20 further incorporating the filtration aspect of the present invention utilizing the zones of interest. At a block 100, participants in the multi-user application timestamp information regarding their present status and forward the information to an area server. At a block 102, the area server receives postcards containing the information on local participants in the area it manages.

At a decision block 104, the area server determines, based on zones of interest defined within the application environment and related to particular participants, whether the information for each local participant is pertinent to any other local participant in the area managed by the area server. If one or more other participants are interested in any other participant, the logic proceeds to a block 106. At block 106, the area server makes copies of information on local participants for every interested local participant in the area, and proceeds to a block 108. If no other participants are interested, the logic of decision block proceeds to block 108.

At block 108, the area server makes copies of the information received from each local participant for distribution to all interested local participants and every other area server in distributed system 20. The number of distribution copies needed is therefore dependent on the number of interested local participants and on the number of other area servers involved in administering the multi-user application. At a block 110, the area server distributes copies of the information on each local participant to all other local participants as well as to every other area server in the distributed system.

At a block 112, the area server receives postcards containing information on participants in other area of distributed system 20 from every other area server. At a decision block 114, the area server determines, based on zones of interest defined within the application environment and related to particular participants, whether the information for each remote participant is pertinent to the local participants in the area managed by the area server. If one or more of the local participants are interested in any remote participants, the logic proceeds to a block 116. At block 116, the area server makes copies of information on remote participants for every interested local participant in the area, and proceeds to a block 118. If no other participants are interested, the logic of decision block proceeds to block 118. At a block 118, the area server distributes copies of information on remote participants to all local participants in its area across the area network.

It should be appreciated that both the number of zones defined and the object types used in definition are exemplary only and highly dependent on the particular multi-user application. Nevertheless, by defining multiple zones of interest and assigning priority rates to objects therein, the distributed system of the present invention enables the dynamic evaluation of participant data prior to the transmission of postcards communicating participant information across the network backbones. Using the zones of interest assigned throughout an application environment allows the multi-user applications to limit the amount of data transmitted via postcards across the network backbone to only the most pertinent information required by each set of non-local participants. Reducing the size and number of the postcards transmitted alleviates network backbone loading and optimally utilizes backbone bandwidth.

Seamless Multi-Server Management of Application Environment Regions Using Filtration The distributed system architecture discussed above further facilitates optimal utilization of network backbone bandwidth limitations by allowing multiple servers to manage participants in distinct portions of an application environment. The application environment of a multi-user application is divided into a plurality of regions. Multiple local servers are assigned to administer the multi-user application, one or more servers dedicated to managing participants within a particular region of the application environment. By use of multiple zones of interest around each participant and along the boundaries between neighboring regions, interaction across regional boundaries is provided without sacrificing continuity among participants or increasing the number of postcards transmitted to uninterested participants in distinct regions. This maintains the send/receive imbalance inherent in all multi-user application close to the local areas of the distributed system and therefore allows an increased number of national participants without proportionally increasing the network backbone burden. The division of the application environment into multiple regions is illustrated with reference to FIGS. 6–8.

Figure 6:
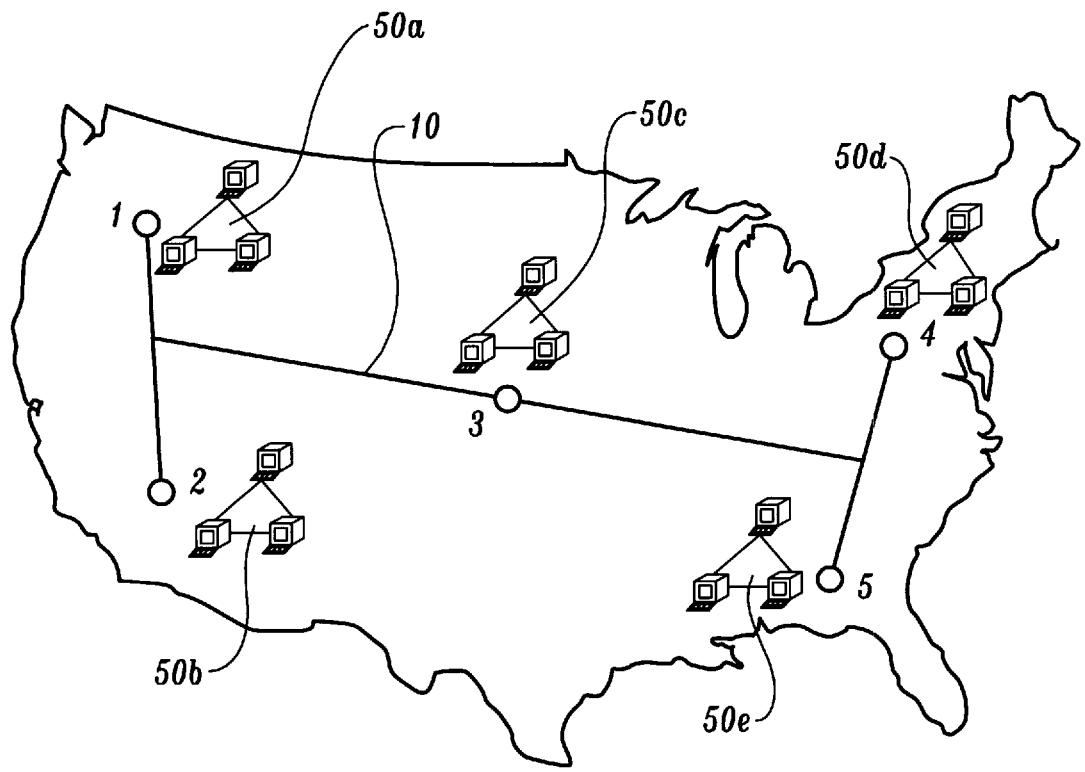
FIG. 6 is a graphical depiction of the distributed system formed in accordance with the present invention wherein a multi-user application is operated over a national network backbone connecting a plurality of discrete local areas representing distinct computer networks having multiple servers using multi-server management.

FIG. 6 shows a simple graphical depiction of the boundaries of a particular territory, again the United States. Five discrete areas labeled A through E representing distinct computer networks 50a through 50e are connected by the national network backbone 10. In a first example illustrated in FIGS. 7A–7D, in a particular multi-user application networks 50b and 50e each have five servers 52–60 and 62–70, respectively.

The distributed system of the present invention allows each of the dedicated servers in networks 50b and 50e, namely, servers 52–60 and servers 62–70, to be assigned to administer a particular region within an application environment. FIG. 7C depicts graphically a single three dimensional application environment 72 of a multi-user application that is divided into regions managed by each of the servers 52–60 and 62–70. Application environment 72 includes a large sphere 74 and a smaller sphere 76. The large sphere 74 has been conveniently divided into four quadrants 74a through 74d, each quadrant representing a specific region within application environment 72. The smaller sphere 76 is a fifth region within the same environment. In this particular multi-user application, server 52 and, correspondingly, server 62 would be assigned to manage participants in quadrant 74a. The remaining servers from both regional network 50b and 50e would be assigned to manage participants in the other regions, defined by quadrants of 74 and sphere/region 76 of application environment 72 as set forth in the table shown in FIG. 7D.

So long as participants within each region remain within their original regions and no activity between regions occurs, division of the management of the application environment among multiple servers reduces the number of postcards needed to be sent out to participants within a given application environment, and correspondingly reduces communication link and network backbone loading. Server 52 need only communicate participant information regarding Region 74a to server 62; server 54 need only communicate participant information regarding Region 74b to server 64; and so on. If region boundaries are definite, such as in the case of Region 76 with respect to Regions 74a–74d, the limited communication is sufficient. For example, servers 60 and 70, assigned to manage Region 76, have little concern for Regions 74a–74d because Region 76 is not physically proximate to those regions, and therefore participants in Region 76 do not have an interest in participant activities the distinct regions. Servers 60 and 70 would only become concerned with participants from other regions when they entered Region 76.

The disadvantage of maintaining discrete regions, however, is that participant interaction throughout the entire application environment is not seamless. Without each server having information about every participant that may potentially enter its region, participant activity near and across regions in multi-server operations would not be seamless from the participant's perspective. A participant in region 74a, for example, would see nothing of a participant in region 74b until it crossed the boundary between the two regions, at which point it would appear out of thin air. Likewise, the participant in region 74b would observe another participant in that region approaching the boundary between regions 74b and 74a, only to see that participant vanish into thin air as it crossed the regional boundary. This disadvantage argues for distribution of information about every participant in the application environment to the server managing every region To the extent that a participant in region 74a can be seen by or affect participants in region 74b, 74c, and, to a lesser extent, 74d, it is necessary for servers 52 and 62 to communicate with servers 54–58 and 64–68. This, however, defeats any benefits to be gained from multi-server operation by failing to reduce the number of postcards sent out and the corresponding load on the communication links and network backbones.

Incorporation of the filtration technique into the distributed system of the present invention is therefore critical to providing seamless transition across regional boundaries within an application environment without increasing backbone loading. In addition to using zones of interest related to participants to communicate pertinent information to other participants as described above, the filtration technique can also be applied to establish overlap areas along the boundaries between neighboring regions. By monitoring activity along the boundary of its region overlapping into neighboring regions, each regional server can determine which information along the boundary is pertinent to participants within its region so as to transmit only relevant information to interested regions. By filtering the data only to interested servers in limited regions, the size and number of postcards transmitted over the network backbone can be minimized.

Referring again to FIG. 7C, while Region 76 has no area of overlap with Regions 74a–74d, Regions 74a–74d have varying degrees of overlapping area with neighboring regions. Overlapping area is defined as that surface area between regions along with the maximum area encompassed by a zone of interest of any given participant. By communicating participant data based on its relevance to other participants, each server is able to minimize its communication with servers controlling neighboring regions. As a participant in Region 74a approaches Region 74b, and to the extent each of its zones of interest cross into the overlap area between regions 74a and 74b, servers 52 and/or 62, would communicate with servers 54 and/or 64 regarding the data pertinent to the zone of interest overlap. Servers 54 and/or 64, in turn, would pass along such data only to participants whose zones of interest likewise cross into the overlap area between the regions.

Figures 8A, 8B, 8C, 8D:
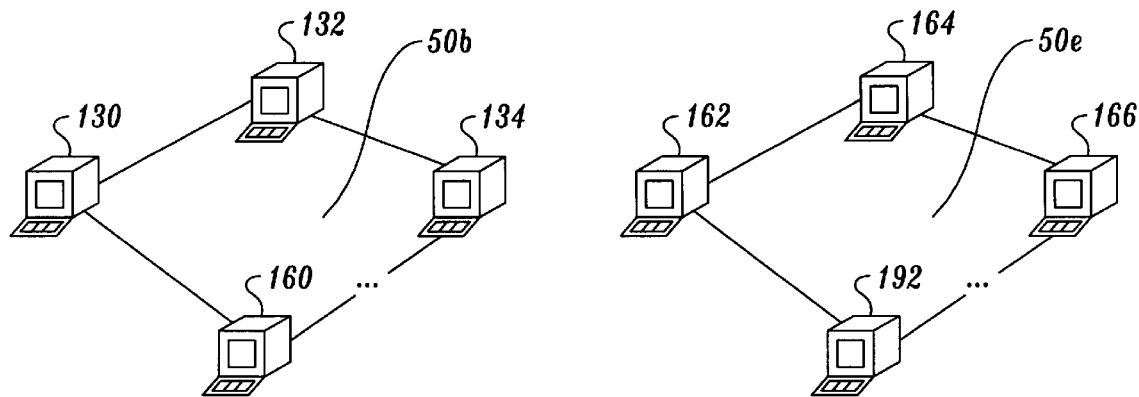
FIG. 8A is a graphical depiction of one of the plurality of discrete local area computer networks of FIG. 6 having sixteen servers.
FIG. 8B is a graphical depiction of another one of the plurality of discrete local area computer networks of FIG. 6 having sixteen servers.
FIG. 8C is a graphical depiction of an application environment in a multi-user application that is divided into regions, each region being managed by a server as described in the present invention.
FIG. 8D is a table showing a correspondence between the servers set forth in FIGS. 8A and 8B and the management of the specific application environment regions defined in FIG. 8C.
Figure 9:
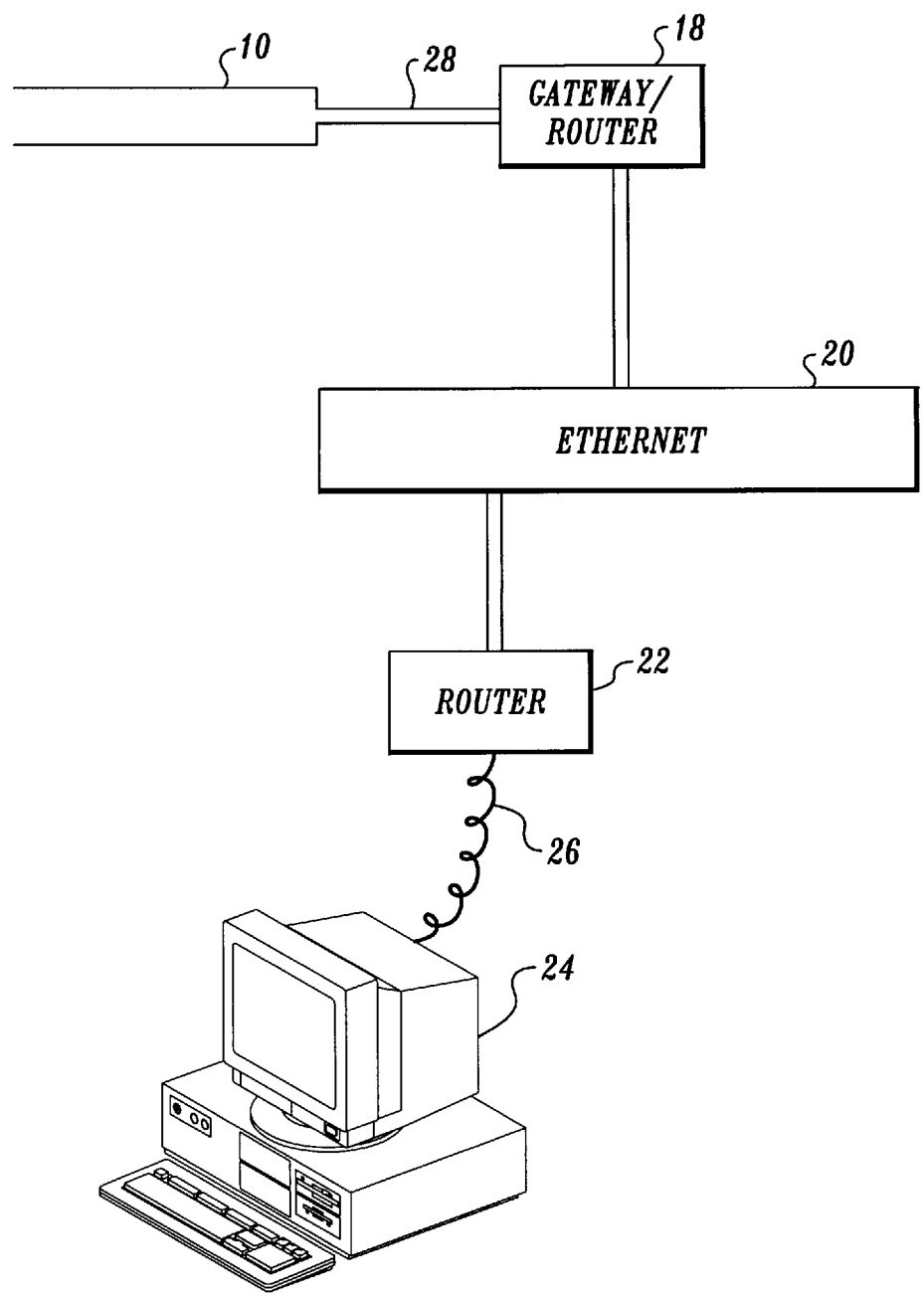
FIG. 9 is a simplified block diagram of a network provider.

In a second example illustrated in FIGS. 8A–8D, in a particular multi-user application networks 50b and 50e each have sixteen servers 130–160 and 162–192, respectively. The distributed system of the present invention allows each of the dedicated servers in networks 50b and 50e, namely, servers 130–160 and 162–192, to be assigned to administer a particular region within an application environment. FIG. 8C depicts graphically a single two dimensional application environment 200 of a multi-user application that is divided into regions managed by each of the servers 130–160 and 162–192. Application environment 200 includes sixteen discrete territories representing specific regions labeled Regions A–P. In this particular multi-user application, server 130 and, correspondingly, server 162 would be assigned to manage participants in Region A. Server 160 and, correspondingly, server 192 would be assigned to manage participants in Region P. The remaining servers from both regional network 50b and 50e would be assigned to manage participants in the other regions of application environment 200 as set forth in the table shown in FIG. 8D.

In the distributed system of the present invention, zones of interest would be defined along the overlapping areas between each discrete neighboring region. For example, zones of interest would be defined along Region A's borders with Regions B, E, and F. Both servers 130 and 162 would be interested in information on all participant in Region A, but only those participants in Regions B, E, and F that fell within the overlap area those regions have with Region A or were implicated within the zones of interest for particular participants implicated in transition between the regions. Servers 130 and 162 would not be interested in participants in the remaining regions. This would limit the amount of information needed to be transmitted to other servers in the multi-user application across the network backbone.

Figure 4C:
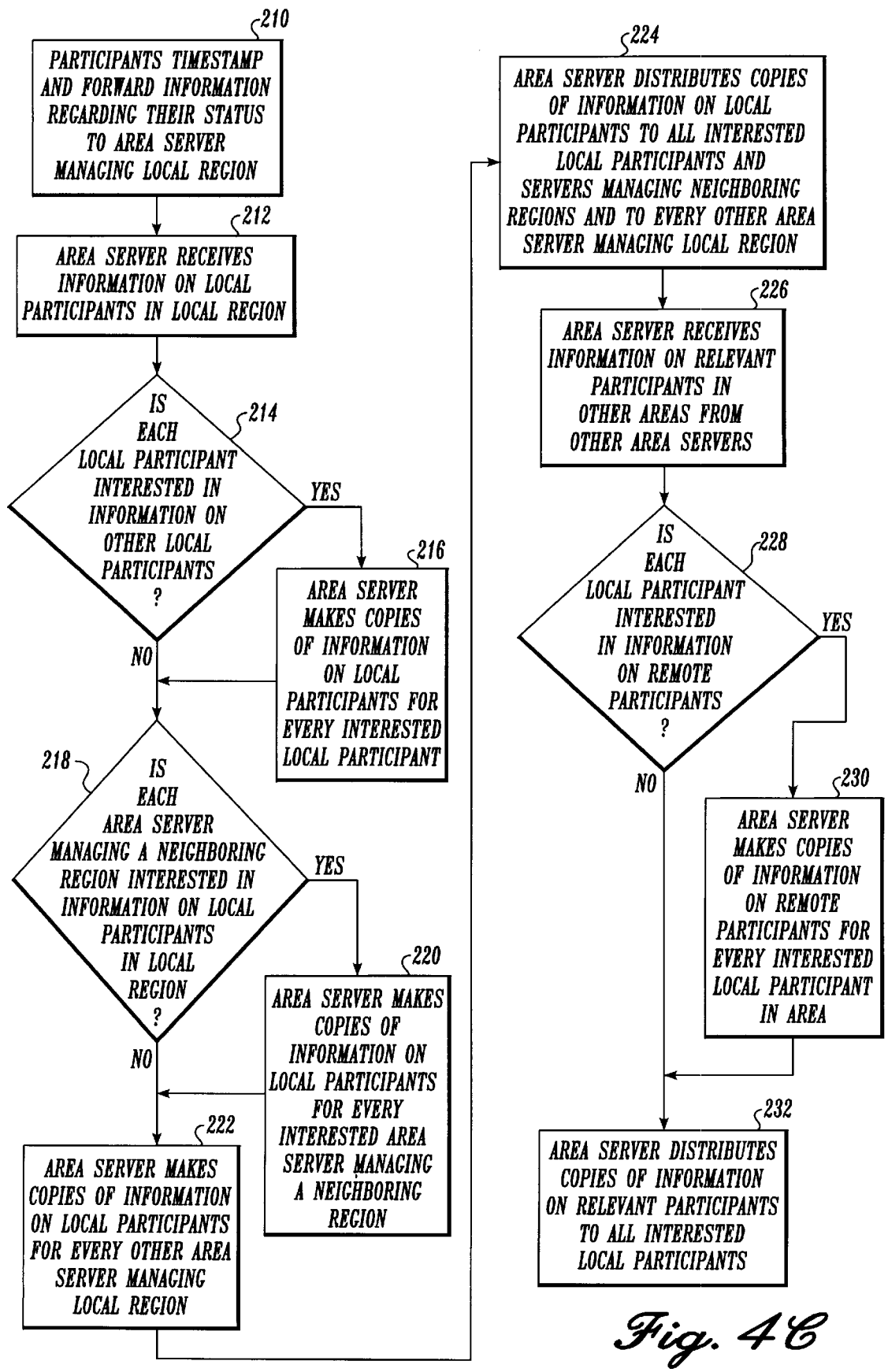
FIG. 4C is a flowchart of the operational logic of the distributed system of FIG. 4B further incorporation the operational logic of the filtration aspect of the present invention applied to a distributed system using multi-server management.

Filtration using the zones of interest defined according to the present invention is easily applied in the multi-server management context. FIG. 4C constitutes a flowchart of the operational logic of distributed system 20 further incorporating the filtration aspect of the present invention utilizing the zones of interest. At a block 210, participants in the multi-user application timestamp information regarding their present status and forward the information to an area server. At a block 212, the area server receives postcards containing the information on local participants in the area it manages.

At a decision block 214, the area server determines, based on zones of interest defined within the application environment and related to particular participants, whether the information for each local participant is pertinent to any other local participant in the area managed by the area server. If one or more other participants are interested in any other participant, the logic proceeds to a block 216. At block 216, the area server makes copies of information on local participants for every interested local participant in the area, and proceeds to a decision block 218. If no other participants are interested, the logic of decision block proceeds to decision block 218.

At decision block 218, the area server determines, based on zones of interest defined within the application environment, whether the information for each local participant is pertinent to any other local participant in the area managed by the area server. If one or more area servers managing a neighboring region is interested in any local participant, the logic proceeds to a block 220. At block 220, the area server makes copies of information on local participants for every interested area server managing a neighboring region, and proceeds to a block 222. If no neighboring area servers are interested, the logic of decision block proceeds to block 222.

At block 222, the area server makes copies of the information received from each local participant for every other area server managing the same local region. With reference to FIGS. 7A–7D, for example, server 52 would made copies of the information for server 62. With reference to FIGS. 8A–8D, server 130 would made copies of the information for server 162. The number of distribution copies needed is therefore dependent on the number of interested local participants, the number of interested area servers managing neighboring regions, and the number of other area servers managing the same local region. Returning to FIG. 4C, at a block 224, the area server distributes copies of the information on each local participant to all interested local participants and servers managing neighboring regions and to every area server managing the same local region.

At a block 226, the area server receives postcards containing information on relevant participants in areas of distributed system 20 from other area servers. At a decision block 228, the area server determines, based on zones of interest defined within the application environment and related to particular participants, whether the information for each remote participant is pertinent to the local participants in the area managed by the area server. If one or more of the local participants are interested in any remote participants, the logic proceeds to a block 230. At block 230, the area server makes copies of information on remote participants for every interested local participant in the area, and proceeds to a block 232. If no other participants are interested, the logic of decision block proceeds to block 232. At block 232, the area server distributes copies of information on relevant participants to all local participants in its area across the area network.

It should be appreciated that further reduction in backbone loading can be achieved by altering the operational logic of the present invention to allow each server co-managing a particular region but located geographically remote on the backbone to distribute relevant information to geographically local servers managing neighboring regions. This option would be an alternative to requiring the originating server to distribute the information across the network backbone to each geographically remote server implicated in a neighboring region. While this would require the originating server to send information out to the co-managing server, which in turn would copy and distribute the information, thus creating a small increase in postcard latency, this tradeoff would provide further reduction in backbone loading.

Filtering the participant data based on the zone of interest enables minimal but adequate interaction among participants across multiple regions within the application environment. Without an acknowledgment of and solution for overlapping regions, multi-server operation would not gain any benefits because postcards would go out to all participants despite multi-server operation and would therefore suffer from backbone loading problems. The number of postcards sent along the network backbone in such systems remains dependent on the total number of participants in the application environment and the number of servers managing the multi-user application.

In the distributed system of the present invention, in contract, instead of communicating participant data to every other participant through every other application server, participant data is only communicated to other participants implicated by areas of overlap between neighboring regions. Because the area of overlap between regions is small compared with the entire region, the number of participants implicated by the overlapping areas will be a correspondingly smaller percentage of the total number of participants in the region. Therefore, increasing the number of regions in the application environment or the number of participants per region increases the network backbone load to a proportionally smaller extent using the filtration process of the present invention.

While the preferred embodiment of the invention has been illustrated and described, it will be appreciated that various changes can be made therein without departing from the spirit and scope of the invention. The number of servers could easily be varied according to the size of the network used for a particular multi-user application. Likewise, the present invention contemplates division of an application environment of a multi-user application into a number of different regions, dependent on the needs of the particular application and the number of dedicated servers available for application administration.

The present invention also contemplates achieving the aforementioned advantages by implementation on a variety of different types and sizes of networks. The techniques described above are equally applicable to any network used in multi-user applications that suffers backbone loading due to bandwidth limitations. For example, not only do bandwidth limitations on national network backbones provide problems in multi-user applications, bandwidth problems causing burdening of local network backbones also limit universal participation in national multi-user applications. FIG. 8 shows a simplified block diagram of a network provider. The national network backbone 10 is typically reduced to a T1 communication link 28. The T1 link, in turn, feeds into a gateway or router 18, which links to a LAN 20 such as via an ethernet link. The ethernet, in turn, typically links via a router 22 to a server or individual participant 24 via a communication link 26 such as a telephone line. Compared to the national network backbone 10 which transmits data at 45 megabytes per second (mbps) and the T1 link which transmits at 1.544 mbps, the telephone line typically links to a modem with a data transmission rate of 28.8 or 14.4 kilobytes per second (kbps). Bandwidth limitations along local communications links at the local-participant level therefore likewise create barriers to fully interactive multi-user applications, for which application of the concepts of the present invention provides the above-described advantages.

The embodiments of the invention in which an exclusive property or privilege is claimed are defined as follows:

1. In a distributed system comprising a plurality of servers interconnected by a network backbone, each server hosting at least one local client, and each local client having at least one local participant, a method for allowing a plurality of participants to participate in a multi-user application, the multi-user application including a distributed global application environment comprising a plurality of local application environments, each local application environment residing on an associated server, each local application environment comprising a plurality of parameters relating to a local participant, the method for each server comprising:

(a) receiving local participant information from a local client regarding a local participant, the local participant information comprising a change in a parameter of the local application environment;

(b) evaluating the local participant information based on relevance of the parameter to other local participants to determine the number and identity of local participants interested in the local participant information;

(c) copying the local participant information for every local participant interested in the information;

(d) copying the local participant information for every other server in the distributed system;

(e) distributing by the local server a copy of the local participant information to every local participant interested in the information; wherein distribution of the local participant information is restricted to local participants interested in the local participant information; and (f) distributing by the local server a copy of the local participant information to every other server in the distributed system, but not distributing by the local server a copy of the local participant information to any remote participant to thereby reduce the number of copies of local participant information being distributed to participants.

2. A distributed system for use in a communication network to reduce bandwidth loading along a network backbone in a multi-user application, comprising:

(a) a communication network backbone; and (b) a local server connected to at least one remote server by the network backbone, each server having a plurality of associated participants to the multi-user application, wherein each server administers the multi-user application with respect to its associated participants by maintaining data related to the multi-user application relevant to each associated participant at the local server and communicating data to each remote server, said administration comprising:

(i) receiving, at the local server, local participant information associated with participants administered by the local server;

(ii) copying the local participant information for other participants administered by the local server;

(iii) copying the local participant information for remote servers;

(iv) distributing by the local server a copy of the local participant information to other local participants administered by the local server;

(v) distributing by the local server a copy of the local participant information to each remote server, but not distributing by the local server a copy of the local participant information to any remote participant to thereby reduce the number of copies of local participant information being distributed to participants;

(vi) receiving, from a remote server, remote participant information associated with participants administered by the remote server;

(vii) copying the remote participant information for local participants administered by the local server; and (viii) distributing by the local server a copy of the remote participant information to each local participant administered by the local server.

3. The distributed system of claim 2, wherein data is transmitted among servers over said network backbone using a multicast protocol.

4. The distributed system of claim 2, wherein data is transmitted among servers over said network backbone using a point-to-point protocol.

5. A method for allowing a plurality of participants to participate in an application environment of a distributed multi-user application in a system having at least one local server and at least one remote server interconnected by a network having a finite bandwidth, each server having at least one participant in the multi-user application for which it administers the multi-user application, comprising:

(a) receiving, by the local server, local participant information from participants administered by the local server;

(b) copying the local participant information for other participants administered by the local server;

(c) copying the local participant information for remote servers;

(d) distributing by the local server a copy of the local participant information to each of the other participants administered by the local server;

(e) distributing by the local server a copy of the local participant information to each of the remote servers, but not distributing by the local server a copy of the local participant information to any remote participant to thereby reduce the number of copies of local participant information being distributed to participants;

(f) receiving, by the local server, remote participant information associated with participants administered by the remote server;

(g) copying the remote participant information for participants administered by the local server; and (h) distributing by the local server a copy of the remote participant information to each participant administered by the local server.

6. The method of claim 5, wherein the distributed system maintains a global timebase and the local participant information includes a timestamp associated with each participant's information related to the global timebase that is used to extrapolate current participant status to other participants to the multi-user application in the distributed system.

7. The method of claim 5 wherein a plurality of zones of interest are defined within the application environment, and wherein:

(a) the step of copying the local participant information for other participants administered by the local server comprises:
  (i) evaluating local participant information according to zones of interest;
  (ii) determining which local participants are interested in the local participant information;
  (iii) prioritizing local participant information based on relevance of the information to other participants administered by the local server;
  (iv) filtering local participant information based on priority and according to network bandwidth limitations so as to optimize network bandwidth utilization; and
  (v) copying the filtered local participant information for interested participants administered by the local server; and (b) the step of distributing the local participant information to other participants administered by the local server comprises distributing the local participant information to all participants administered by the local server interested in the local participant information.

8. The method of claim 7, wherein:

(a) the zones of interest in the application environment contain at least one object having object characteristics; and (b) the step of evaluating local participant information according to zones of interest comprises distinguishing between the object characteristics of objects within the zones of interest.

9. The method of claim 8, wherein:

(a) each participant defines at least one zone of interest; and (b) the step of copying the local participant information for other participants administered by the local server comprises evaluating local participant information according to other participants' zones of interest.

10. The method of claim 9, wherein:

(a) object characteristics include the type of the object;

(b) at least one participant assigns a type to an object within the zone of interest; and (c) the step of evaluating local participant information further comprises comparing the types of the objects with the zone of interest.

11. The method of claim 9, wherein:

(a) object characteristics include the position of the object;

(b) at least one participant assigns a position to an object within the zone of interest; and (c) the step of evaluating local participant information further comprises comparing the positions of objects with the zone of interest.

12. The method of claim 9, wherein:

(a) object characteristics include the priority of the object;

(b) each participant assigns a priority to an object within the zone of interest; and (c) the step of evaluating local participant information further comprises comparing the priority of objects within the zone of interest.

13. The method of claim 9, wherein:

(a) object characteristics include the data rate for communication of information related to the associated object;

(b) each participant assigns a data rate to an object within the zone of interest; and (c) the step of evaluating local participant information further comprises comparing the data rate of objects within the zone of interest.

14. The method of claim 9, wherein the step of evaluating local participant information according to other participants' zones of interest comprises:

(a) coalescing zones of interest into related groups;

(b) evaluating local participant information according to each group;

(c) determining which groups are interested in local participant information;

(d) for each group showing interest, evaluating each zone of interest; and (e) for each zone of interest implicating local participant information, determining which local participants have specified the zone of interest.

15. The method of claim 9, wherein:
(a) each server defines at least one zone of interest;
(b) the step of copying the local participant information for remote servers comprises:
  (i) evaluating local participant information according to remote server's zones of interest;
  (ii) determining which remote servers are interested in the local participant information;
  (iii) prioritizing local participant information based on relevance of the information to remote servers;
  (iv) filtering local participant information based on priority and according to network bandwidth limitations so as to optimize network bandwidth utilization; and
  (v) copying the filtered local participant information for interested remote servers; and
(c) the step of distributing the local participant information to remote servers comprises distributing the local participant information to all remote servers interested in the local participant information.

16. The method of claim 15, wherein the step of evaluating local participant information according to remote servers' zones of interest comprises:
(a) coalescing zones of interest into related groups;
(b) evaluating local participant information according to each group;
(c) determining which groups are interested in local participant information;
(d) for each group showing interest, evaluating each zone of interest; and
(e) for each zone of interest implicating local participant information, determining which remote servers have specified the zone of interest.

17. The method of claim 15, wherein the step of each server defining at least one zone of interest comprises:
(a) evaluating all zones of interest defined by local participants; and
(b) coalescing all zones of interest into at least one zone of interest for each server.

18. The method of claim 8, wherein:
(a) each server defines at least one zone of interest;
(b) the step of copying the local participant information for remote servers comprises:
  (i) evaluating local participant information according to remote server's zones of interest;
  (ii) determining which remote servers are interested in the local participant information;
  (iii) prioritizing local participant information based on relevance of the information to remote servers;
  (iv) filtering local participant information based on priority and according to network bandwidth limitations so as to optimize network bandwidth utilization; and
  (v) copying the filtered local participant information for interested remote servers; and
(c) the step of distributing the local participant information to remote servers comprises distributing the local participant information to all remote servers interested in the local participant information.

19. The method of claim 18, wherein the step of evaluating local participant information according to remote servers' zones of interest comprises:
(a) coalescing zones of interest into related groups;
(b) evaluating local participant information according to each group;
(c) determining which groups are interested in local participant information;
(d) for each group showing interest, evaluating each zone of interest; and
(e) for each zone of interest implicating local participant information, determining which remote servers have specified the zone of interest.

20. The method of claim 5, wherein a plurality of zones of interest are defined within the application environment, and wherein:
(a) the step of copying the remote participant information for participants administered by the local server comprises:
  (i) evaluating remote participant information according to zones of interest;
  (ii) determining which local participants are interested in the remote participant information;
  (iii) prioritizing remote participant information based on relevance of the information to interested participants administered by the local server;
  (iv) filtering remote participant information based on priority and according to network bandwidth limitations so as to optimize network bandwidth utilization; and
  (v) copying the filtered remote participant information for interested participants administered by the local server; and
(b) the step of distributing the local participant information to participants administered by the local server comprises distributing the remote participant information to all participants administered by the local server interested in the local participant information.

21. The method of claim 20, wherein:
(a) the zones of interest in the application environment contain a plurality of objects having object characteristics; and
(b) the step of evaluating local participant information according to zones of interest comprises distinguishing between the object characteristics of objects within the zones of interest.

22. The method of claim 21, wherein:
(a) each participant defines at least one zone of interest; and
(b) the step of copying the local participant information for other participants administered by the local server comprises evaluating local participant information according to other participants' zones of interest.

23. The method of claim 22, wherein:
(a) object characteristics include the type of the object;
(b) at least one participant assigns a type to an object within the zone of interest; and
(c) the step of evaluating local participant information further comprises comparing the types of the objects with the zone of interest.

24. The method of claim 22, wherein:
(a) object characteristics include the position of the object;
(b) at least one participant assigns a position to an object within the zone of interest; and
(c) the step of evaluating local participant information further comprises comparing the positions of objects with the zone of interest.

25. The method of claim 22, wherein:
(a) object characteristics include the priority of the object;

(b) each participant assigns a priority to an object within the zone of interest; and (c) the step of evaluating local participant information further comprises comparing the priority of objects within the zone of interest.

26. The method of claim 22, wherein:

(a) object characteristics include the data rate for communication of information related to the object;

(b) each participant assigns a data rate to an object within the zone of interest; and (c) the step of evaluating local participant information further comprises comparing the data rate of objects within the zone of interest.

27. The method of claim 22, wherein the step of evaluating local participant information according to other participants' zones of interest comprises:

(a) coalescing zones of interest into related groups;

(b) evaluating local participant information according to each group;

(c) determining which groups are interested in local participant information;

(d) for each group showing interest, evaluating each zone of interest; and (e) for each zone of interest implicating local participant information, determining which local participants have specified the zone of interest.

28. The method of claim 22, wherein:

(a) each server defines at least one zone of interest;

(b) the step of copying the local participant information for remote servers comprises:

(i) evaluating local participant information according to remote server's zones of interest;

(ii) determining which remote servers are interested in the local participant information;

(iii) prioritizing local participant information based on relevance of the information to remote servers;

(iv) filtering local participant information based on priority and according to network bandwidth limitations so as to optimize network bandwidth utilization; and (v) copying the filtered local participant information for interested remote servers; and (c) the step of distributing the local participant information to remote servers comprises distributing the local participant information to all remote servers interested in the local participant information.

29. The method of claim 28, wherein the step of evaluating local participant information according to remote servers' zones of interest comprises:

(a) coalescing zones of interest into related groups;

(b) evaluating local participant information according to each group;

(c) determining which groups are interested in local participant information;

(d) for each group showing interest, evaluating each zone of interest; and (e) for each zone of interest implicating local participant information, determining which remote servers have specified the zone of interest.

30. The method of claim 28, wherein the step of each server defining at least one zone of interest comprises:

(a) evaluating all zones of interest defined by local participants; and (b) coalescing all zones of interest into at least one zone of interest for each server.

31. The method of claim 21, wherein:

(a) each server defines at least one zone of interest;

(b) the step of copying the local participant information for remote servers comprises:

(i) evaluating local participant information according to remote server's zones of interest;

(ii) determining which remote servers are interested in the local participant information;

(iii) prioritizing local participant information based on relevance of the information to remote servers;

(iv) filtering local participant information based on priority and according to network bandwidth limitations so as to optimize network bandwidth utilization; and (v) copying the filtered local participant information for interested remote servers; and (c) the step of distributing the local participant information to remote servers comprises distributing the local participant information to all remote servers interested in the local participant information.

32. The method of claim 31, wherein the step of evaluating local participant information according to remote servers' zones of interest comprises:

(a) coalescing zones of interest into related groups;

(b) evaluating local participant information according to each group;

(c) determining which groups are interested in local participant information;

(d) for each group showing interest, evaluating each zone of interest; and (e) for each zone of interest implicating local participant information, determining which remote servers have specified the zone of interest.

33. The method of claim 5, wherein the application environment is divided into a plurality of regions, each region is administered by at least one server having at least one participant in the multi-user application, a plurality of zones of interest are defined within each region of the application environment, and wherein:

(a) the step of copying the local participant information for remote servers comprises:

(i) evaluating local participant information according the zones of interest;

(ii) determining which remote servers administering participants in neighboring regions are interested in the local participant information, wherein each neighboring region shares at least one common overlapping subregion with the region administered by the local server, the common overlapping subregion comprising at least a portion of the neighboring region and at least a portion of the region administered by the local server;

(iii) prioritizing local participant information based on relevance of the information to the remote servers administering participants in neighboring regions;

(iv) filtering local participant information based on priority and according to network bandwidth limitations so as to optimize network bandwidth utilization; and (v) copying the filtered local participant information for interested remote servers administering participants in neighboring regions; and (b) the step of distributing the local participant information to remote servers comprises distributing the local participant information to interested remote servers administering participants in neighboring regions.

34. The method of claim 33, wherein:
(a) the zones of interest in the application environment contain a plurality of objects having object characteristics; and
(b) the step of evaluating local participant information according to zones of interest comprises distinguishing between the object characteristics of objects within the zones of interest.

35. The method of claim 34, wherein:
(a) each participant defines at least one zone of interest; and
(b) the step of copying the local participant information for other participants administered by the local server comprises evaluating local participant information according to other participants' zones of interest.

36. The method of claim 35, wherein:
(a) object characteristics include the type of the object;
(b) at least one participant assigns a type to an object within the zone of interest; and
(c) the step of evaluating local participant information further comprises comparing the types of the objects with the zone of interest.

37. The method of claim 35, wherein:
(a) object characteristics include the position of the object;
(b) at least one participant assigns a position to an object within the zone of interest; and
(c) the step of evaluating local participant information further comprises comparing the positions of objects with the zone of interest.

38. The method of claim 35, wherein:
(a) object characteristics include the priority of the object;
(b) each participant assigns a priority to an object within the zone of interest; and
(c) the step of evaluating local participant information further comprises comparing the priority of objects within the zone of interest.

39. The method of claim 35 wherein:
(a) object characteristics include the data rate for communication of information related of the object;
(b) each participant assigns a data rate to an object within the zone of interest; and
(c) the step of evaluating local participant information further comprises comparing the data rate of objects within the zone of interest.

40. The method of claim 35, wherein the step of evaluating local participant information according to other participants' zones of interest comprises:
(a) coalescing zones of interest into related groups;
(b) evaluating local participant information according to each group;
(c) determining which groups are interested in local participant information;
(d) for each group showing interest, evaluating each zone of interest; and
(e) for each zone of interest implicating local participant information, determining which local participants have specified the zone of interest.

41. The method of claim 35, wherein:
(a) each server defines at least one zone of interest;
(b) the step of copying the local participant information for remote servers comprises:
   (i) evaluating local participant information according to remote server's zones of interest;
   (ii) determining which remote servers are interested in the local participant information;
   (iii) prioritizing local participant information based on relevance of the information to remote servers;
   (iv) filtering local participant information based on priority and according to network bandwidth limitations so as to optimize network bandwidth utilization; and
   (v) copying the filtered local participant information for interested remote servers; and
(c) the step of distributing the local participant information to remote servers comprises distributing the local participant information to all remote servers interested in the local participant information.

42. The method of claim 41, wherein the step of evaluating local participant information according to remote servers' zones of interest comprises:
(a) coalescing zones of interest into related groups;
(b) evaluating local participant information according to each group;
(c) determining which groups are interested in local participant information;
(d) for each group showing interest, evaluating each zone of interest; and
(e) for each zone of interest implicating local participant information, determining which remote servers have specified the zone of interest.

43. The method of claim 41, wherein the step of each server defining at least one zone of interest comprises:
(a) evaluating all zones of interest defined by local participants; and
(b) coalescing all zones of interest into at least one zone of interest for each server.

44. The method of claim 34, wherein:
(a) each server defines at least one zone of interest;
(b) the step of copying the local participant information for remote servers comprises:
   (i) evaluating local participant information according to remote server's zones of interest;
   (ii) determining which remote servers are interested in the local participant information;
   (iii) prioritizing local participant information based on relevance of the information to remote servers;
   (iv) filtering local participant information based on priority and according to network bandwidth limitations so as to optimize network bandwidth utilization; and
   (v) copying the filtered local participant information for interested remote servers; and
(c) the step of distributing the local participant information to remote servers comprises distributing the local participant information to all remote servers interested in the local participant information.

45. The method of claim 44, wherein the step of evaluating local participant information according to remote servers' zones of interest comprises:
(a) coalescing zones of interest into related groups;
(b) evaluating local participant information according to each group;
(c) determining which groups are interested in local participant information;
(d) for each group showing interest, evaluating each zone of interest; and
(e) for each zone of interest implicating local participant information, determining which remote servers have specified the zone of interest.

46. The method of claim 33, wherein each local region is administered by a plurality of servers, and wherein:

(a) the step of copying the local participant information for remote servers comprises copying the local participant information for every other server administering the local region; and (b) the step of distributing the local participant information to remote servers comprises distributing the local participant information to every other server administering the local region.

47. A method for allowing a plurality of participants in a global application environment of a multi-user application, the global application environment defining a plurality of zones of interest, wherein the multi-user application is administered in a server connected to a plurality of participant stations by a network having a finite bandwidth, wherein the global application environment comprises a plurality of local application environments, one corresponding to each participant station, wherein each local application environment comprises a plurality of objects, each object comprising a parameter relating to a corresponding participant within the multi-user application the method comprising:

(a) running local versions of the multi-user application at the participant stations such that users at the participant stations interact with corresponding local application environments;

(b) sending, by the participant stations, participant information to the server; wherein the participant information comprises a changed object of the local application environment;

(c) receiving, by the server, participant information from the plurality of participant stations;

(d) evaluating participant information according to zones of interest;

(e) determining which of the other participants are interested in the participant information;

(f) prioritizing participant information based on relevance of the information to the other participants;

(g) filtering participant information based on priority and according to network bandwidth limitations so as to optimize network bandwidth utilization; and (h) copying the filtered participant information for interested participants; and (i) distributing the filtered participant information only to the interested participants.

48. The method of claim 47, wherein:

(a) the zones of interest in the global application environment contain at least one object having object characteristics; and (b) the step of evaluating participant information according to zones of interest comprises distinguishing between the object characteristics of objects within the zones of interest.

49. The method of claim 48, wherein:

(a) each participant defines at least one zone of interest; and (b) the step of copying the participant information for other participants comprises evaluating participant information according to other participants' zones of interest.

50. The method of claim 49. wherein:

(a) object characteristics include the type of the object;

(b) at least one participant assigns a type to an object within the zone of interest; and (c) the step of evaluating participant information further comprises comparing the types of the objects with the zone of interest.

51. The method of claim 49, wherein:

(a) object characteristics include the position of the object;

(b) at least one participant assigns a position to an object within the zone of interest, and (c) the step of evaluating participant information further comprises comparing the positions of objects with the zone of interest.

52. The method of claim 49, wherein:

(a) object characteristics include the priority of the object;

(b) each participant assigns a priority to an object within the zone of interest; and (c) the step of evaluating participant information further comprises comparing the priority of objects within the zone of interest.

53. The method of claim 49, wherein:

(a) object characteristics include the data rate for communication of information related of the associated object;

(b) each participant assigns a data rate to an object within the zone of interest; and (c) the step of evaluating participant information further comprises comparing the data rate of objects within the zone of interest.

54. The method of claim 49, wherein the step of evaluating participant information according to other participants' zones of interest comprises:

(a) coalescing zones of interest into related groups;

(b) evaluating participant information according to each group;

(c) determining which groups are interested in participant information;

(d) for each group showing interest, evaluating each zone of interest; and (e) for each zone of interest implicating the participant information, determining which participants have specified the zone of interest.

* * * * *

UNITED STATES PATENT AND TRADEMARK OFFICE
CERTIFICATE OF CORRECTION

PATENT NO. : 5,841,980
DATED : November 24, 1998
INVENTOR(S) : Waters et al.

It is certified that error appears in the above-indentified patent and that said Letters Patent is hereby corrected as shown below:

| COLUMN | LINE | |
|---|---|---|
| 28 | 56 | at the end of the claims section, please insert: |

--55. The method of Claim 47, wherein the system maintains a global timebase and the participant information includes a timestamp associated with each participant's information related to the global timebase that is used to extrapolate current participant status to other participants to the multi-user application in the system.--

On the title page, under Abstract, change "54 Claims" to -- 55 Claims --.

Signed and Sealed this

Twenty-seventh Day of April, 1999

*Attest:*

*Attesting Officer*

Q. TODD DICKINSON

*Acting Commissioner of Patents and Trademarks*